United States Patent
Bornea et al.

(10) Patent No.: US 11,574,130 B2
(45) Date of Patent: Feb. 7, 2023

(54) ENHANCING MULTI-LINGUAL EMBEDDINGS FOR CROSS-LINGUAL QUESTION-ANSWER SYSTEM

(71) Applicant: International Business Machines Corporation, Armonk, NY (US)

(72) Inventors: Mihaela Ancuta Bornea, White Plains, NY (US); Lin Pan, Acton, MA (US); Sara Rosenthal, Spring Valley, NY (US); Avirup Sil, Hopewell Junction, NY (US); Radu Florian, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 17/103,649

(22) Filed: Nov. 24, 2020

(65) Prior Publication Data
US 2022/0164538 A1  May 26, 2022

(51) Int. Cl.
*G06F 40/58* (2020.01)
*G06F 40/30* (2020.01)
*G06N 20/00* (2019.01)

(52) U.S. Cl.
CPC ............. *G06F 40/30* (2020.01); *G06F 40/58* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 10,073,843 B1 | 9/2018 | Seligman et al. | |
| 11,295,219 B2* | 4/2022 | English | G06N 7/005 |
| 2004/0064305 A1* | 4/2004 | Sakai | G06F 40/55 |
| | | | 704/9 |

(Continued)

FOREIGN PATENT DOCUMENTS

JP     2019078989 A     5/2019

OTHER PUBLICATIONS

Weston, Jason, "Dialog-Based Language Learning", 30th Conference on Neural Information Processing Systems (NIPS 2016), Barcelona, Spain.

(Continued)

*Primary Examiner* — Nafiz E Hoque
(74) *Attorney, Agent, or Firm* — Patterson + Sheridan, LLP (57) ABSTRACT

A method includes receiving, by a question-answer system, a question in a first language and the question in a second language and predicting, by the question-answer system, a first answer to the question in the first language and a second answer to the question in the second language. The method also includes generating, by the question-answer system, a first vector representing the question in the first language and a second vector representing the question in the second language and adjusting the question-answer system based on the first and second answers and the first and second vectors such that when the question-answer system subsequently generates a third vector representing the question in the first language and a fourth vector representing the question in the second language, a distance between the third and fourth vectors is less than a distance between the first and second vectors.

20 Claims, 5 Drawing Sheets

(56) References Cited

U.S. PATENT DOCUMENTS

| | | | | |
|---|---|---|---|---|
| 2010/0145673 | A1* | 6/2010 | Cancedda | G06F 16/3337 704/3 |
| 2017/0091175 | A1* | 3/2017 | Kanayama | G06F 40/58 |
| 2017/0262434 | A1* | 9/2017 | Sumita | G06F 16/29 |
| 2018/0349359 | A1* | 12/2018 | McCann | G06N 3/08 |
| 2020/0184158 | A1* | 6/2020 | Kuczmarski | G06F 40/47 |
| 2021/0182291 | A1* | 6/2021 | Yoldemir | G06F 16/3329 |
| 2022/0093088 | A1* | 3/2022 | Rangarajan Sridhar | G06F 16/338 |

OTHER PUBLICATIONS

Loginova, et al."Toward Multilingual Neural Question Answering", New Trends in Databases and Information Systems. ADBIS 2018. Communications in Computerand Information Science, vol. 909. Aug. 2018.

Hirota, et al."Emu: Enhancing Multilingual Sentence Embedding with Semantic Specialization", Association for the Advancement of Artificial Intelligence, Nov. 24, 2019.

Anonymous, "System and Method to Generate User Profiles Based on Question and Answer Interchange", ip.com, Sep. 29, 2014.

Anonymous, "System and Method for Comprehension and Inference of DL Model from Image Sources", ip.com, Jul. 26, 2018.

Anonymously, "Machine Learning to Select Input Language on a Software Keyboard", ip.com, Dec. 15, 2017.

Mccann, et al. "The Natural Language Decathlon: Multitask Learning as Question Answering", Jun. 20, 2018.

Bonadiman, et al."Multitask Learning with Deep Neural Networks for Community Question Answering", Feb. 13, 2017.

Anonymous, "Are Mulit-Lingual Language Models Sufficient for Cross-Language Tasks: Experiments in Reading Comprehension", EMNLP 2020 Submission, 2020.

Chen, et al., "Adversarial Deep Averging Networks for Cross-Lingual Sentiment Classification", Aug. 18, 2018.

Cui, et al., "Cross-Lingual Machine Reading Comprehension", Sep. 1, 2019.

Keung, et al., "Adversarial Learning with Contextual Embeddings for Zero-Resource Cross-Lingual Classification and NER", Mar. 19, 2020.

Wallace, et al., "Universal Adversarial Triggers for Attacking and Analyzing NLP", Aug. 29, 2019.

Wang, et al., "Robust Machine Comprehension Models via Adversarial Training", Apr. 17, 2018.

Yang, et al. "Improving Machine Reading Comprehension via Adversarial Training", Nov. 9, 2019.

Yuan, et al., "Enhancing Answer Boundary Detection for Multilingual Machine Reading Comprehension", May 8, 2020.

Zhu, et al., "FreeLB: Enhanced Adversarial Training for Natural Language Understanding", ICLR 2020.

* cited by examiner

ENHANCING MULTI-LINGUAL EMBEDDINGS FOR CROSS-LINGUAL QUESTION-ANSWER SYSTEM

BACKGROUND

The present invention relates to machine learning, and more specifically, to training a machine learning model for a multi-lingual question-answer system. Generally, question-answer systems use machine learning models to predict answers to questions. For example, a question-answer system may be provided textual information (referred to as a context) and a question related to that textual information. The question-answer system may implement a machine learning model that analyzes the context and the question to determine a suitable answer. The machine learning model extracts text from the context to form the answer. The correctness of that answer may then be evaluated to adjust or tune the machine learning model.

The machine learning model may be trained using training data that includes contexts, questions, and reference answers. Many of these machine learning models are trained in English because English training data is readily available. It may be desirable to train these machine learning models to predict answers to questions presented in multiple languages so that users who do not understand English can use these machine learning models. It may not, however, be practical or possible to train the machine learning models to handle all these languages because training data may not exist for many languages. Additionally, generating the training data for those languages may be prohibitively expensive and slow. As a result, it remains challenging to train these machine learning models to answer questions in languages other than English.

SUMMARY

According to one embodiment of the present invention, a method includes receiving, by a question-answer system, a question in a first language and the question in a second language and predicting, by the question-answer system, a first answer to the question in the first language and a second answer to the question in the second language. The method also includes generating, by the question-answer system, a first vector representing the question in the first language and a second vector representing the question in the second language and adjusting the question-answer system based on the first and second answers and the first and second vectors such that when the question-answer system subsequently generates a third vector representing the question in the first language and a fourth vector representing the question in the second language, a distance between the third and fourth vectors is less than a distance between the first and second vectors. In this manner, the method trains a question-answer system to answer questions in a second language even if training data in the second language is not available.

In an embodiment, the method may also include determining a first loss based on the first answer and a reference answer, determining a second loss based on the second answer and the reference answer, and determining a third loss based on the first answer and the second answer. Adjusting the question-answer system may be based on the first, second, and third losses, and the distance between the first and second vectors. In this manner, the question-answer system may be adjusted to answer questions in the second language as well as the question-answer system answers questions in the first language (e.g., English).

The distance between the first and second vectors may be based on a cosine of the first and second vectors. In this manner, the question-answer system may quickly determine distances between vectors.

In some embodiments, the method also includes receiving a context. The first answer may include text extracted from the context. In this manner, the question-answer system may quickly predict answers to questions by analyzing the text of the context.

In an embodiment, the method further includes machine translating the question in the first language to produce the question in the second language. In this manner, the question-answer system may be trained to answer questions in a second language even though training data is only available in a first language.

In certain embodiments, the method also includes training the question-answer system to predict answers based on training data in the first language. In this manner, the question-answer system may be trained to answer questions in a first language to provide a platform from which the question-answer system may be trained to answer questions in a second language.

According to another embodiment, an apparatus includes a memory and a hardware processor communicatively coupled to the memory. The hardware processor receives a question in a first language and the question in a second language and predicts, using a machine learning model, a first answer to the question in the first language and a second answer to the question in the second language. The hardware processor also generates, using the machine learning model, a first vector representing the question in the first language and a second vector representing the question in the second language and adjusts the machine learning model based on the first and second answers and the first and second vectors such that when the machine learning model subsequently generates a third vector representing the question in the first language and a fourth vector representing the question in the second language, a distance between the third and fourth vectors is less than a distance between the first and second vectors. In this manner, the apparatus can be trained to answer questions in a second language even if training data in the second language is not available.

In an embodiment, the hardware processor may also determine a first loss based on the first answer and a reference answer, determine a second loss based on the second answer and the reference answer, and determine a third loss based on the first answer and the second answer. Adjusting the question-answer system may be based on the first, second, and third losses, and the distance between the first and second vectors. In this manner, the apparatus may be adjusted to answer questions in the second language as well as it answers questions in the first language (e.g., English).

The distance between the first and second vectors may be based on a cosine of the first and second vectors. In this manner, the apparatus may quickly determine distances between vectors.

In some embodiments, the hardware processor also receives a context. The first answer may include text extracted from the context. In this manner, the apparatus may quickly predict answers to questions by analyzing the text of the context.

In an embodiment, the hardware processor also machine translates the question in the first language to produce the question in the second language. In this manner, the apparatus may be trained to answer questions in a second language even though training data is only available in a first language.

In certain embodiments, the hardware processor also trains the question-answer system to predict answers based on training data in the first language. In this manner, the apparatus may be trained to answer questions in a first language to provide a platform from which the question-answer system may be trained to answer questions in a second language.

According to another embodiment, a method includes receiving, by a question-answer system, a context in a first language and a question in a second language and predicting, by the question-answer system and based on the context, a first answer to the question. The method also includes generating, by the question-answer system, a first vector representing the question and determining a first probability distribution of languages predicted, based on the first vector, for the second language. The method further includes adjusting the question-answer system based on the first answer and the first vector such that when the question-answer system subsequently predicts a second answer to the question, generates a second vector representing the question, and determines a second probability distribution of languages predicted, based on the second vector, for the second language, a determined loss between the second answer and a reference answer is less than a determined loss between the first answer and the reference answer and the second probability distribution is closer to a uniform distribution than the first probability distribution. In this manner, the method trains a question-answer system to answer questions in a second language even if training data in the second language is not available.

In particular embodiments, the method also includes determining a first loss based on the first probability distribution and the second language. Adjusting the question-answer system is further based on the first loss such that a determined second loss based on the second probability distribution and the second language is less than the first loss based on the first probability distribution and the second language. In this manner, the question-answer system may be adjusted to answer questions in the second language as well as the question-answer system answers questions in the first language (e.g., English).

In certain embodiments, the method also includes machine translating the question in the first language to produce the question in the second language. In this manner, the question-answer system may be trained to answer questions in a second language even though training data is only available in a first language.

In some embodiments, the method further includes training the question-answer system to predict answers based on training data in the first language. In this manner, the question-answer system may be trained to answer questions in a first language to provide a platform from which the question-answer system may be trained to answer questions in a second language.

According to another embodiment, an apparatus includes a memory and a hardware processor communicatively coupled to the memory. The hardware processor receives, by a question-answer system, a context in a first language and a question in a second language and predicts, by the question-answer system and based on the context, a first answer to the question. The hardware processor also generates, by the question-answer system, a first vector representing the question and determines a first probability distribution of languages predicted, based on the first vector, for the second language. The hardware processor further adjusts the question-answer system based on the first answer and the first vector such that when the question-answer system subsequently predicts a second answer to the question, generates a second vector representing the question, and determines a second probability distribution of languages predicted, based on the second vector, for the second language, a determined loss between the second answer and a reference answer is less than a determined loss between the first answer and the reference answer and the second probability distribution is closer to a uniform distribution than the first probability distribution. In this manner, the apparatus can be trained to answer questions in a second language even if training data in the second language is not available.

In some embodiments, the hardware processor also determines a first loss based on the first probability distribution and the second language. Adjusting the question-answer system is further based on the first loss such that a determined second loss based on the second probability distribution and the second language is less than the first loss based on the first probability distribution and the second language. In this manner, the apparatus may be adjusted to answer questions in the second language as well as it answers questions in the first language (e.g., English).

In certain embodiments, the hardware processor further machine translate the question in the first language to produce the question in the second language. In this manner, the apparatus may be trained to answer questions in a second language even though training data is only available in a first language.

In particular embodiments, the hardware processor also train the question-answer system to predict answers based on training data in the first language. In this manner, the question-answer system may be trained to answer questions in a first language to provide a platform from which the question-answer system may be trained to answer questions in a second language.

DETAILED DESCRIPTION

This disclosure describes methods to train a machine learning model for a multi-lingual question-answer system. Question-answer systems use machine learning models to predict answers to questions. Many of these machine learning models are trained in English because English training data is readily available. It may be desirable to train these machine learning models to predict answers to questions presented in multiple languages so that users who do not understand English can use these machine learning models. It may not, however, be practical or possible to train the machine learning models to handle all these languages because training data may not exist for many languages.

Additionally, generating the training data for those languages may be prohibitively expensive and slow. As a result, it remains challenging to train these machine learning models to answer questions in languages other than English.

This disclosure describes a process for training the machine learning model to answer questions in a language with training data in that language is not available. In some embodiments, the machine learning model may be trained to answer questions presented in a first language for which training data (e.g., contexts, questions, and reference answers) is readily available. Then, the training questions can be machine translated into a second language and the machine learning model may be trained using those translated questions and the same, untranslated contexts and reference answers. During the training, adjustments may be made to the machine learning model to bring its predicted answers for the translated questions closer to its predicted answers for the untranslated questions. Additionally, the machine learning model may generate vectors representing the untranslated question and the translated question. During training, adjustments may be made to the machine learning model to bring these vectors closer together. In this manner, the machine learning model is trained to answer questions in a second language even though training data in the second language is not readily available.

In certain embodiments, the machine learning model is presented with a context, question, and a reference answer in a first language. The machine learning model machine translates the question into a second language and then analyzes the context and the translated question to predict an answer. The machine learning model is then adjusted to bring its predicted answer for the translated question closer to the reference answer. Additionally, the machine learning model may generate a vector representing the translated question. A discriminator then analyzes the vector to predict a probability distribution of languages for the second language. During training, the machine learning model is adjusted to bring the probability distribution for the vector closer to the uniform distribution. Furthermore, the discriminator is adjusted to bring the probability distribution closer to a prediction for the second language (e.g., the probability for the second language in the probability distribution is 1). In this manner, the discriminator is trained to achieve a goal that is adverse to the goals of the machine learning model, which better trains the machine learning model to answer questions in a second language even though training data in the second language is not readily available.

Figure 1:
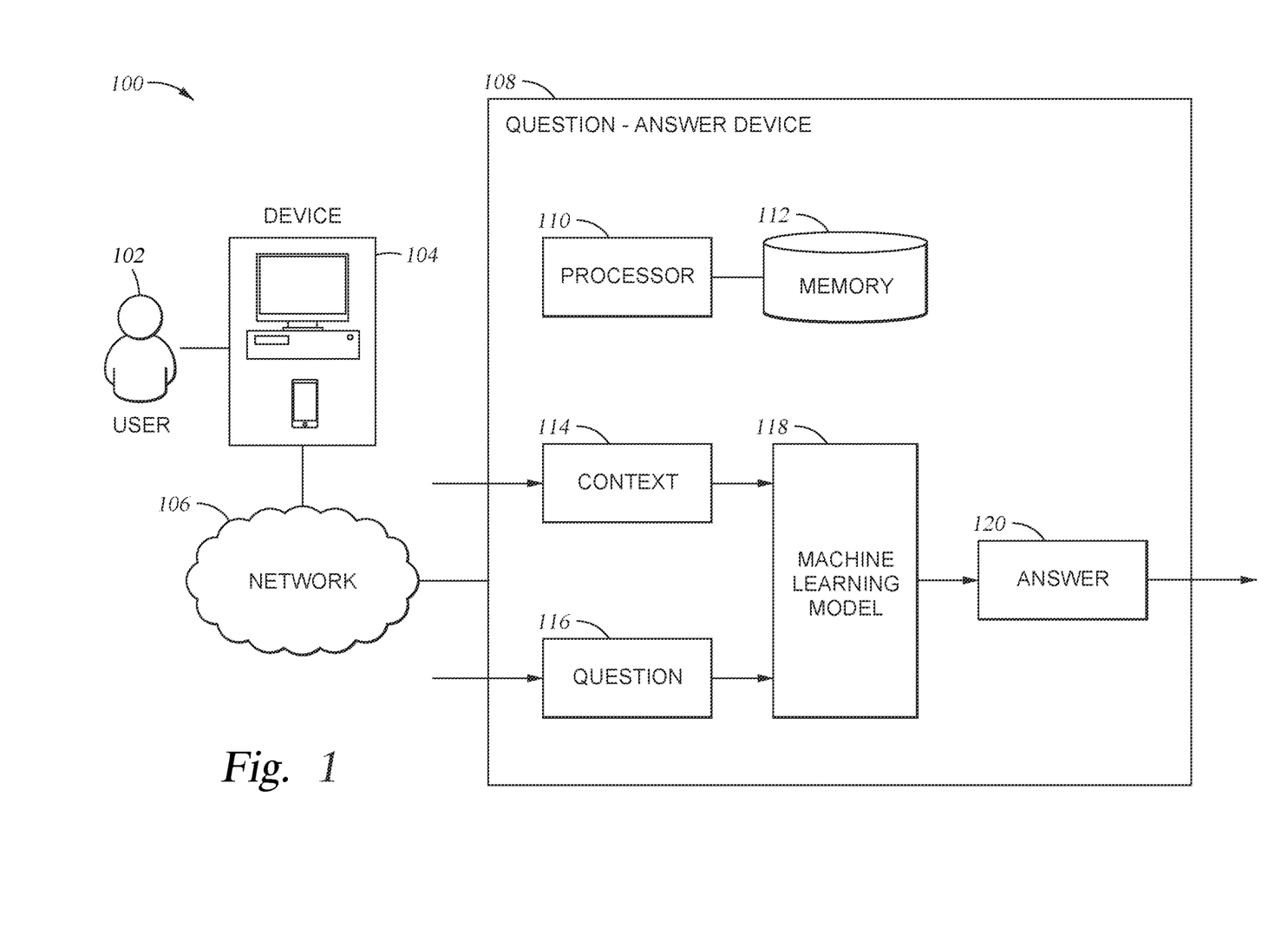
FIG. 1 illustrates an example question-answer system.

FIG. 1 illustrates in example question-answer system 100. As seen in FIG. 1, the question-answer system 100 includes a device 104, a network 106, and a question-answer device 108. Generally, the question-answer system 100 uses a machine learning model to predict answers to questions presented in different languages. In certain embodiments, the machine learning model is trained to handle queries in a variety of languages, even though training data in those languages may not be available.

A user 102 uses one or more devices 104 to interact with other components of the question-answer system 100. For example, the user 102 may use the device 104 to communicate contexts and questions to the question-answer device 108. As another example the user 102 may use the device 104 to receive answers from the question-answer device 108. The device 104 may include any suitable device for communicating with components of system 100 over network 106. As an example and not by way of limitation, the device 104 may be a computer, a laptop, a wireless or cellular telephone, an electronic notebook, a personal digital assistant, a tablet, or any other device capable of receiving, processing, storing, and/or communicating information with other components of system 100. The device 104 may also include a user interface, such as a display, a microphone, keypad, or other appropriate terminal equipment usable by user 102. The device 104 may include a hardware processor, memory, and/or circuitry configured to perform any of the functions or actions of device 104 described herein. For example, a software application designed using software code may be stored in the memory and executed by the processor to perform the functions of device 104.

The network 106 allows communication between the various components of the system 100. This disclosure contemplates the network 106 being any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The question-answer device 108 predicts answers to questions presented in multiple languages. As seen in FIG. 1, the question-answer device 108 includes a processor 110 and a memory 112, which are configured to perform any of the functions of the question-answer device 108 described herein. The question-answer device 108 may be implemented in a distributed architecture across multiple processors 110 and memories 112 (e.g., in a datacenter) that each perform one or more functions of the question-answer device 108 described herein. In particular embodiments the question-answer device 108 can train a machine learning model to predict answers to questions presented in various languages, even though training data in those languages may not be available.

The processor 110 is any electronic circuitry, including, but not limited to microprocessors, application specific integrated circuits (ASIC), application specific instruction set processor (ASIP), and/or state machines, that communicatively couples to memory 112 and controls the operation of the question-answer device 108. The processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 110 may include other hardware that operates software to control and process information. The processor 110 executes software stored on memory to perform any of the functions described herein. The processor 110 controls the operation and administration of the question-answer device 108 by processing information (e.g., information received from the device 104, network 106, and memory 112). The processor 110 may be a programmable logic device, a microcontroller, a microprocessor, any suitable processing device, or any suitable combination of the preceding. The processor 110 is not limited to a single processing device and may encompass multiple processing devices.

The memory 112 may store, either permanently or temporarily, data, operational software, or other information for the processor 110. The memory 112 may include any one or a combination of volatile or non-volatile local or remote devices suitable for storing information. For example, the memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 112, a disk, a CD, or a flash drive. In particular embodiments, the software may include an application executable by the processor 110 to perform one or more of the functions described herein.

The question-answer device 108 receives a context 114 and a question 116 (e.g., from the device 104). Generally, the context 114 provides information that can be used to answer the question 116. The context 114 and the question 116 are provided to a machine learning model 118. The machine learning model 118 analyzes the context 114 and the question 116 to predict an answer 120. The machine learning model 118 may be implemented within the question-answer device 108 by the processor 110 and the memory 112. The question-answer device 108 then communicates the answer 120 to another component of the question-answer system 100, such as, for example, the device 104.

As an example, a context 114 might be the following passage: Vinegar was known early in civilization as the natural result of exposure of beer and wine to air, because acetic acid-producing bacteria are present globally. The use of acetic acid in alchemy extends into the 3rd century BC. The question 116 may be: What is a common product of beer and/or wine exposed to air? The machine learning model 118 analyzes the context 114 and the question 116 to predict an answer 120. Generally, the machine learning model 118 extracts text from the context 114 that the machine learning model 118 predicts to be the answer 120 to the question 116. For example, the machine learning model 118 may predict that the answer 120 to the question 116 is "vinegar." This example assumes that the machine learning model 118 has been trained in English using English training data, which is widely available. It may be more difficult to train the machine learning model 118 to understand other languages, especially when training data in those languages is not readily available. In those instances, the machine learning model 118 may be inadequately trained and make inaccurate predictions. For example, if the same question 116 were presented in Vietnamese (Sản phẩm thông thu'ờ'ng của bia và/ho rượu c rượu khi tiếp xúc với không khí là gì?). Ideally, the machine learning model 118 would predict the same answer 120 whether the question 116 is presented in English or Vietnamese. However, because Vietnamese training data may not be as widely available or robust as English training data, the machine learning model 118 may be inadequately trained in Vietnamese and predict the answer 120 to be "acetic acid-producing bacteria." This disclosure contemplates an iterative training process using machine-translated questions that can train the machine learning model 118 to answer questions in various languages even though training data in those languages may not be available.

Figure 2A:
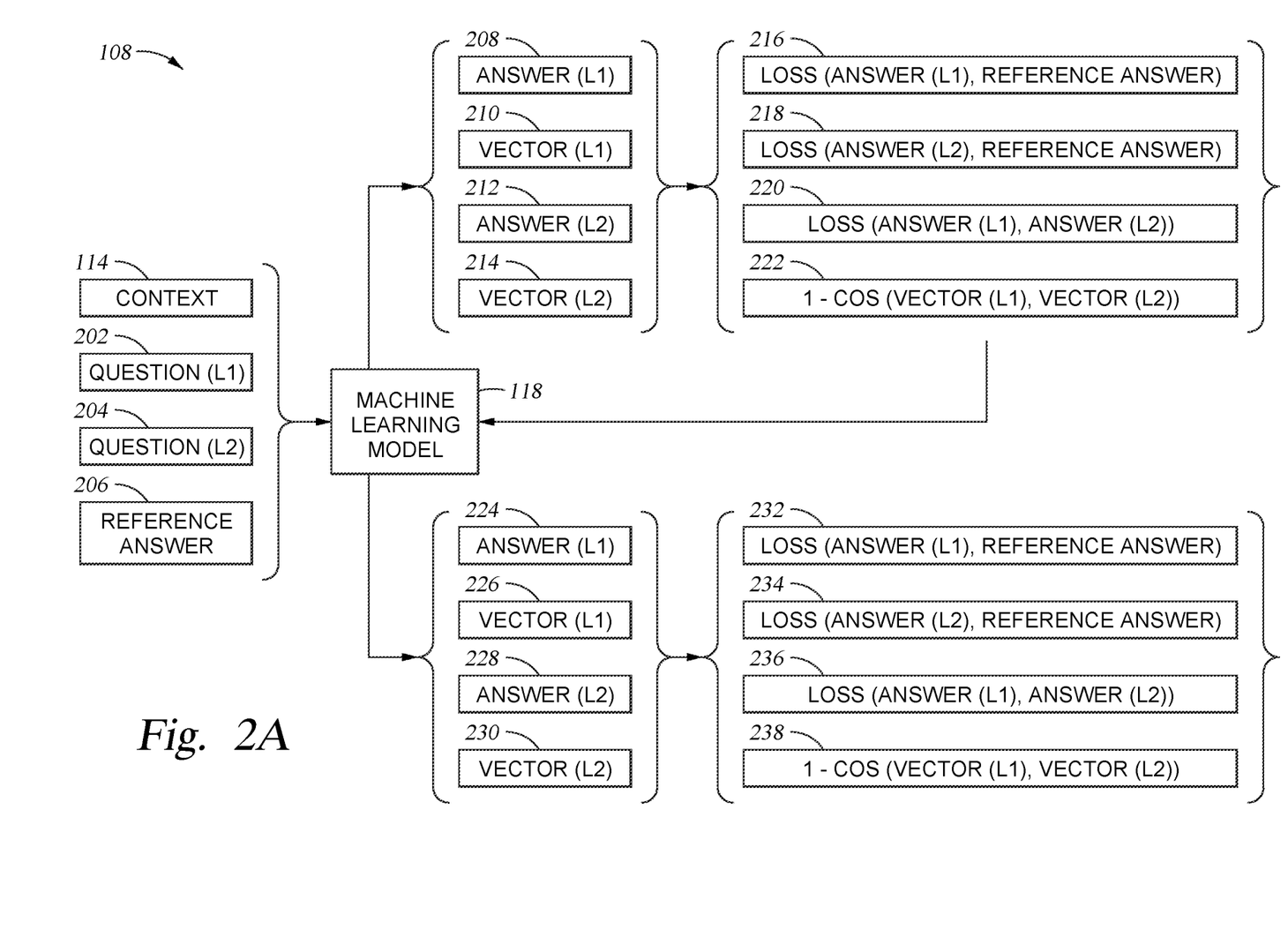
FIG. 2A illustrates an example of training a machine learning model in the question-answer system of FIG. 1.
Figure 2B:
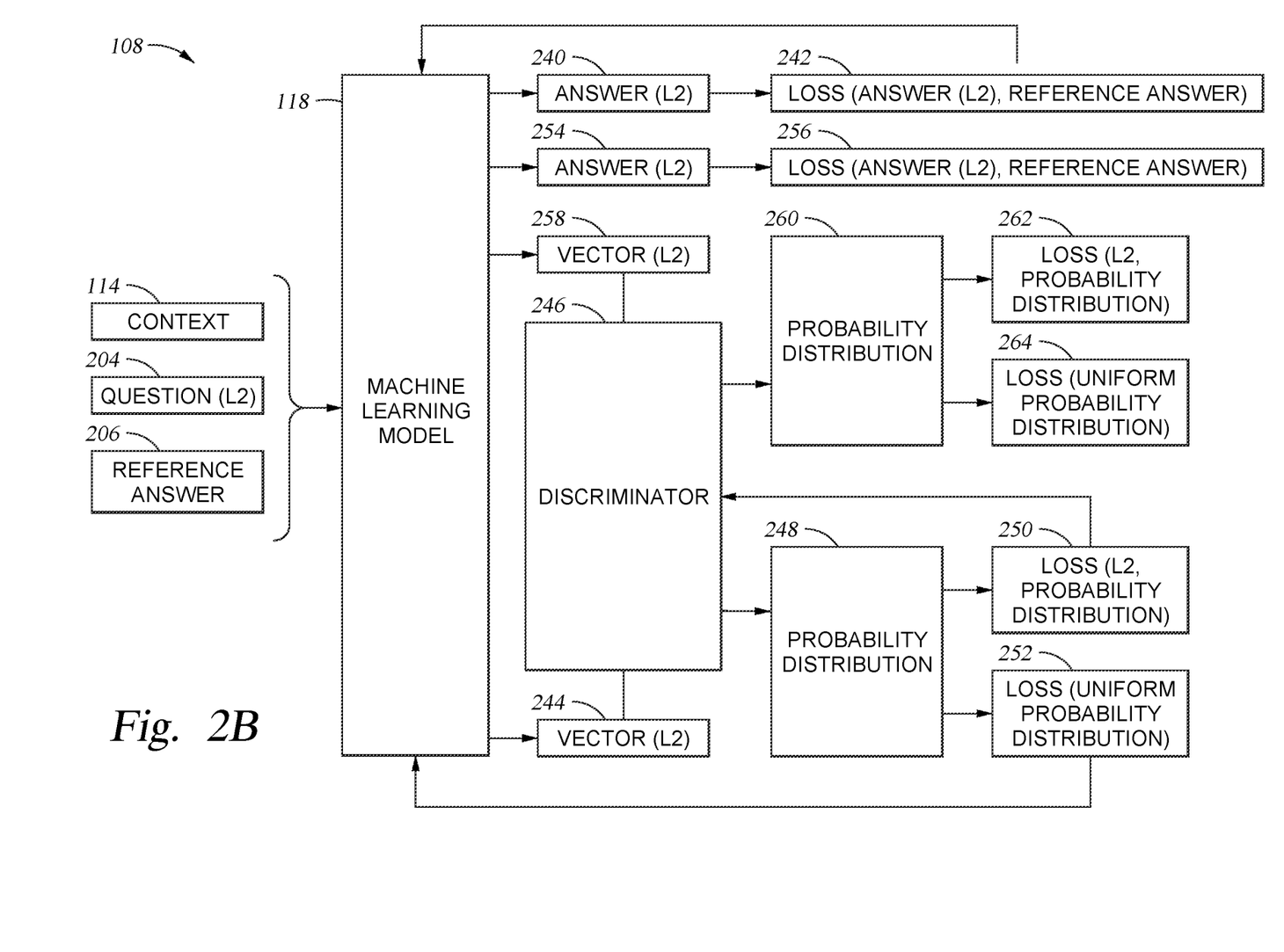
FIG. 2B illustrates an example of training a machine learning model in the question-answer system of FIG. 1.

FIGS. 2A and 2B illustrate examples of training a machine learning model 118 in the question-answer system 100 of FIG. 1. Generally, the question-answer device 108 trains the machine learning model 118 using one or more iterative processes. Machine translation may be used to generate training data in various languages. Even though these translations are not typically accurate, the iterative training process may overcome the inaccuracies in the machine translations, in certain embodiments.

FIG. 2A illustrates a first process for training the machine learning model 118. Generally, in this first process, the question-answer device 108 adjusts the machine learning model 118 based on determined differences and distances of the training questions and predicted answers.

The question-answer device 108 receives a context 114, a question (L1) 202, a question (L2) 204, and a reference answer 206 to train the machine learning model 118. The context 114 includes text from which an answer to the question (L1) 202 and question (L2) 204 may be extracted or predicted. Using the previous example, the context 114 includes text that explains that vinegar is the product of exposing beer and wine to air.

The question (L1) 202 and question (L2) 204 are the same question presented in two different languages, L1 and L2. The context 114, which is in the first language L1, provides the answer to that question. Using the previous example, the question (L1) 202 may be the question "What is a common product of beer and/or wine exposed to air?" presented in English and the question (L2) 204 may be that same question presented in Vietnamese "Sản phẩm thông thu'ờ'ng của bia và/ rượu với khi tiếp xúc với không khí là gì?" The reference answer 206 is considered to be the correct answer to that question. In the previous example, the reference answer 206 is "Vinegar." Generally, the machine learning model 118 analyzes the context 114 and predicts answers to the question (L1) 202 and the question (L2) 204. These predicted answers are compared to the reference answer 206 to determine adjustments that should be made to the machine learning model 118. In an ideal scenario, the machine learning model 118 predicts the same answer to the question (L1) 202 and the question (L2) 204, and the predicted answer is the same as the reference answer 206.

The question (L2) 204 may be formed by machine translating the question (L1) 202 into the language L2. Although the machine translation may not be a perfect translation, the question (L2) 204 may still be used to train the machine learning model 118 to answer questions in the language L2 because the iterative training process overcomes the inaccuracies in machine translation, in certain embodiments. Stated differently, because of the iterative training process, the question-answer device 108 may train the machine learning model 118 using machine translated questions when training data in the language L2 is not available.

The machine learning model 118 analyzes the context 114 and the received questions to predict answers and to generate vector embeddings for those questions. In the example of FIG. 2A, the machine learning model 118 predicts an answer (L1) 208 to the question (L1) 202 and an answer (L2) 212 to the question (L2) 204. Although the question (L1) 202 and the question (L2) 204 are in different languages, the answer (L1) 208 and the answer (L2) 212 may be in the same language because the predicted answers are formed using text extracted from the context 114.

The machine learning model 118 also generates a vector (L1) 210 based on the question (L1) 202 and a vector (L2) 214 based on the question (L2) 204. The vector (L1) 210 includes a numerical representation of the question (L1) 202. The vector (L2) 214 includes a numerical representation of the question (L2) 204. These numerical representations provide insight into the words in the questions or the meanings of the questions. Thus, the vectors may be language-agnostic representations of the questions. In an ideal scenario, the vector (L1) 202 is identical to the vector (L2) 214 if the question (L1) 202 and the question (L2) 204 are the same question presented in two different languages. The question-answer device 108 analyzes the answer (L1) 208, the vector (L1) 210, the answer (L2) 212, and the vector (L2) 214 to determine the performance of the machine learning model 118 and to make adjustments to the machine learning model 118.

The question-answer device 108 determines a difference 216 between the answer (L1) 208 and the reference answer 206. In the example of FIG. 2A, the question-answer device 108 uses a loss function to determine the difference 216. The difference 216 indicates how well the machine learning model 118 predicted the answer to the question (L1) 202. The ideal performance is for the answer (L1) 208 to be the same as the reference answer 206 and for the difference 216 to be 0. Thus, reducing the difference 216 indicates an improvement to the performance of the machine learning model 118.

The question-answer device 108 determines a difference 218 between the answer (L2) 212 and the reference answer 206. In the example of FIG. 2A, the question-answer device 108 uses a loss function to determine the difference 218. The difference 218 indicates how well the machine learning model 118 predicted the answer to the question (L2) 204. Ideally, the answer (L2) 212 is the same as the reference answer 206 and the difference 218 is 0. Thus, reducing the difference 218 indicates an improvement in the performance of the machine learning model 118.

The question-answer device 108 also determines a difference 220 between the answer (L1) 208 and the answer (L2) 212. In the example of FIG. 2A, the question-answer device 108 uses a loss function to determine the difference 220. The difference 220 indicates how good the machine learning model 118 is at recognizing questions presented in different languages. As discussed previously, the question (L1) 202 and the question (L2) 204 are the same question presented in different languages. For example, the question (L2) 204 may be the question (L1) 202 machine translated to a different language L2. Ideally, the machine learning model 118 predicts the same answer to the question (L1) 202 and the question (L2) 204, and the difference 220 is 0. Thus, a reduction in the difference 220 indicates an improvement in how good the machine learning model 118 is at recognizing questions in different languages.

The question-answer device 108 determines a distance 222 between the vector (L1) 210 and the vector (L2) 214. In the example of FIG. 2A, the question-answer device 108 determines the cosine of the vector (L1) 210 and the vector (L2) 214. If the vector (L1) 210 is similar to the vector (L2) 214, then their cosine will be close to 1. The greater the difference between the vector (L1) 210 and the vector (L2) 214, the closer the cosine is to 0. The question-answer device 108 subtracts the cosine from 1 to determine the distance 222. Because the vector (L1) 210 and the vector (L2) 214 are indicative of the words in the question (L1) 202 and the question (L2) 204 or the meanings of the question (L1) 202 and the question (L2) 204, and because the question (L1) 202 and the question (L2) 204 are the same question presented in different languages, ideally, the vector (L1) 210 and the vector (L2) 214 are the same. Thus, the distance 222 indicates how good the machine learning model 118 is at understanding questions presented in various languages. A reduction in the distance 222 indicates an improvement in the language recognition capabilities of the machine learning model 118.

The question-answer device 108 uses the differences 216, 218, and 220 and the distance 222 to adjust the machine learning model 118 as part of the iterative training process. Generally, the question-answer device 108 adjusts the machine learning model 118 to reduce the differences 216, 218, and 220 and the distance 222. For example, the question-answer device 108 may adjust weights of the machine learning model 118 to indicate to the machine learning model 118 that the answer (L1) 208 should have been the same as the answer (L2) 212 and that the vector (L1) 210 should have been the same as the vector (L2) 214. Additionally, the question-answer device 108 may adjust the weights of the machine learning model 118 to indicate to the machine learning model 118 that the answer (L1) 208 and the answer (L2) 212 should have been the same as the reference answer 206.

After the adjustments are made, the machine learning model 118 may analyze the context 114, the question (L1) 202, and the question (L2) 204 again. The machine learning model 118 may predict an answer (L1) 224 and an answer (L2) 228. Additionally, the machine learning model 118 may generate a vector (L1) 226 and a vector (L2) 230. The question-answer device 108 may then determine a difference 232 between the answer (L1) 224 and the reference answer 206, a difference 234 between the answer (L2) 228 and the reference answer 206, a difference 236 between the answer (L1) 224 and the answer (L2) 228, and a distance 238 between the vector (L1) 226 and the vector (L2) 230. Due to the adjustments made to the machine learning model 118, the difference 232 should be smaller than the difference 216, the difference 234 should be smaller than the difference 218, and the difference 236 should be smaller than the difference 220. Additionally, due to the adjustments to the machine learning model 118, the distance 238 should be less than the difference 222. Stated differently, due to the adjustments made to the machine learning model 118, the answer (L1) 224 and the answer (L2) 228 should be closer to the reference answer 206 than the answer (L1) 208 and the answer (L2) 212. Additionally, the answer (L1) 224 should be closer to the answer (L2) 228 than the answer (L1) 208 is to the answer (L2) 212. Furthermore, the vector (L1) 226 should be closer to the vector (L2) 230 than the vector (L1) 210 is to the vector (L2) 214. The question-answer device 108 may then use the differences 232, 234, and 236 and the distance 238 to make further adjustments to the machine learning model 118. As a result, the machine learning model 118 may predict answers that are closer to the reference answer 206 and predict more similar answers to the same question when the question is presented in different languages.

This training process may be repeated using the same context 114 and question or with different contexts 114 and questions. With each iteration, the question-answer device 108 adjusts the machine learning model 118 (e.g., adjusts the weights of the machine learning model 118) to better answer questions in a different language. In this manner, the machine learning model 118 can be trained to answer questions in a second language even when training data in that language is not available. If the machine learning model 118 is trained to answer questions in one language and if machine translations in the second language are available, then the machine learning model 118 can be trained to answer questions in the second language, in certain embodiments.

FIG. 2B illustrates an example of an alternative, adversarial process for training the machine learning model 118. In particular embodiments, the adversarial process of FIG. 2B may yield a more accurate machine learning model 118 than the example process of FIG. 2A. Generally, in the example of FIG. 2B, the question-answer device 108 implements a discriminator 246 that performs tasks that are adverse to the goals of the machine learning model 118 to better train the machine learning model 118. In certain embodiments, the discriminator 246 is a component of the machine learning model 118.

The machine learning model 118 receives the context 114, the question (L2) 204, and the reference answer 206. As discussed previously, the context 114 is presented in a first language (L1) and includes text that is used to answer the question (L2) 204. The question (L2) 204 is a question presented in a language (L2), which may be different from the language L1 that the machine learning model 118 is trained to recognize. The machine learning model 118 analyzes the question (L2) 204 and the context 114 to predict an answer (L2) 240 to the question (L2) 204 and to generate a vector (L2) 244, which includes a numerical representation of the question (L2) 204 and is indicative of the words in the question (L2) 204 or the meaning of the question (L2) 204.

As with the example of FIG. 2A, the question-answer device 108 determines a difference 242 between the answer (L2) 240 and the reference answer 206. In the example of FIG. 2B, the question-answer device 108 uses a loss function to determine the difference 242. The difference 242 indicates how good the machine learning model 118 is at predicting the correct answer to a question. Thus, a reduction in the difference 242 indicates an improvement in the performance of the machine learning model 118.

The machine learning model 118 generates a vector (L2) 244, which includes a numerical representation of the question (L2) 204. The discriminator 246 analyzes the vector (L2) 244 to determine a probability distribution 248. The probability distribution 248 is a distribution of the probabilities that the question (L2) 204 is in a particular language. For example, if the probability distribution 248 covered five different languages, then the probability distribution 248 would include five probabilities. Each probability would be the probability that the language L2 is a corresponding one of those five languages. The discriminator 246 may predict the probabilities within the probability distribution 248 based on the information in the vector (L2) 244. Stated differently, the discriminator 246 analyzes the numerical representation of the question (L2) 204 to predict the language L2. In an ideal scenario, the machine learning model 118 generates the same vector for the same question regardless of the language in which the question is presented, and the discriminator 246 cannot discern the language of the question from the vector.

The question-answer device 108 then determines a difference 250 between the probability distribution 248 and the language L2 of the question (L2) 204. In the example of FIG. 2B, the question-answer device 208 uses a loss function to determine the difference 250. For example, the question-answer device 108 may analyze the probabilities in the probability distribution 248, and in particular, the probability for the language L2 in the probability distribution 248. If the discriminator correctly predicted the language L2, then the probability for the language L2 would be 1 and the other probabilities in the probability distribution 248 would be 0. The difference 250 indicates how accurately the discriminator 246 predicted the language L2. For example, the difference 250 may be the complement of the probability for the language L2 in the probability distribution 248 (1−probability (L2)). The larger the difference 250, the less accurately the discriminator 246 predicted the language of the question (L2) 204. The question-answer device 108 adjusts the discriminator 246 based on the difference 250. For example, the question-answer device 108 may adjust weights within the discriminator 246 to improve the prediction capabilities of the discriminator 246.

The question-answer device 108 also determines a difference 252 between the probability distribution 248 and a uniform distribution. In the example of FIG. 2B, the question-answer device 108 uses a loss function to determine the difference 252. The difference 252 indicates how language agnostic the vector (L2) 244 is. Stated differently, the closer the probability distribution 248 is to the uniform distribution the better the machine learning model 118 is at recognizing the same question presented in different languages. This improved recognition results in the machine learning model 118 generating nearly identical vectors for the same questions, even though the questions are presented in different languages. The question-answer device 108 adjusts the machine learning model 118 based on the difference 252. For example, the question-answer device 108 may adjust the weights of the machine learning model 118 to indicate to the machine learning model 118 how to generate a vector for a question, so that the discriminator 246 experiences more difficulty predicting the language of the question based on the vector. When the discriminator 246 experiences difficulty predicting the language of a question based on the vector, the resulting probability distribution 248 is closer to the uniform distribution.

Through this training process the question-answer device 108 improves the ability of the machine learning model 118 to generate a language agnostic vector, while also improving the ability of the discriminator 246 to predict the language of the question based on the vector. In this manner, the discriminator 246 acts as an adversary to the machine learning model 118. If the machine learning model 118 is able to generate vectors that overcome the language prediction capabilities of the discriminator 246, despite the iterative improvements to the discriminator 246, then the machine learning model 118 also becomes better at understanding questions presented in different languages.

After the adjustments are made to the machine learning model 118 and the discriminator 246, the machine learning model 118 may again predict an answer to the question (L2) 204. The machine learning model 118 predicts an answer (L2) 254 to the question (L2) 204. The question-answer device 108 then determines a difference 256 between the answer (L2) 254 and the reference answer 206. In the example of FIG. 2B, the question-answer device 108 uses a loss function to determine the difference 256. Due to the adjustments made to the machine learning model 118, the difference 256 should be less than the difference 242, indicating an improvement in the ability of the machine learning model 118 to predict the correct answer to the question (L2) 204.

Additionally, the machine learning model 118 generates a vector (L2) 258 that is communicated to the discriminator 246. The discriminator 246 then generates a probability distribution 260 based on the vector (L2) 258. The probability distribution 260 includes probabilities that the question (L2) 204 is presented in various languages. The question-answer device 108 determines a difference 262 between the probability distribution 260 and the language L2. In the example of FIG. 2B, the question-answer device 108 uses a loss function to determine the difference 262. Due to the changes made to the discriminator 246, the difference 262 may be less than the difference 250, indicating an improvement in the ability of the discriminator 246 to correctly predict the language of a question based on the vector representation of that question.

Additionally, the question-answer device 108 determines a difference 264 between the probability distribution 260 and the uniform distribution. In the example of FIG. 2B, the question-answer device 108 uses a loss function to determine the difference 264. Due to the adjustments made to the machine learning model 118, the difference 264 may be less than the difference 252, indicating an improvement in the ability of the machine learning model 118 to generate a language agnostic vector. Stated differently, the better the machine learning model 118 is at generating a language agnostic vector, the more the probability distribution generated by the discriminator 246 resembles the uniform distribution.

This training process may be repeated using the same context 114 and question or with different contexts 114 and questions. With each iteration, the question-answer device 108 adjusts both the machine learning model 118 (e.g., adjusts the weights of the machine learning model 118) to better answer questions in a different language and the discriminator 246 (e.g., adjusts the weights of the discriminator 246) to better predict the language. In this manner, the machine learning model 118 can be trained to answer questions in a second language even when training data in that language is not available. If the machine learning model 118 is trained to answer questions in one language and if machine translations in the second language are available, then the machine learning model 118 can be trained to answer questions in the second language in a manner that overcomes the language prediction capabilities of the discriminator 246, in certain embodiments.

Figure 3:
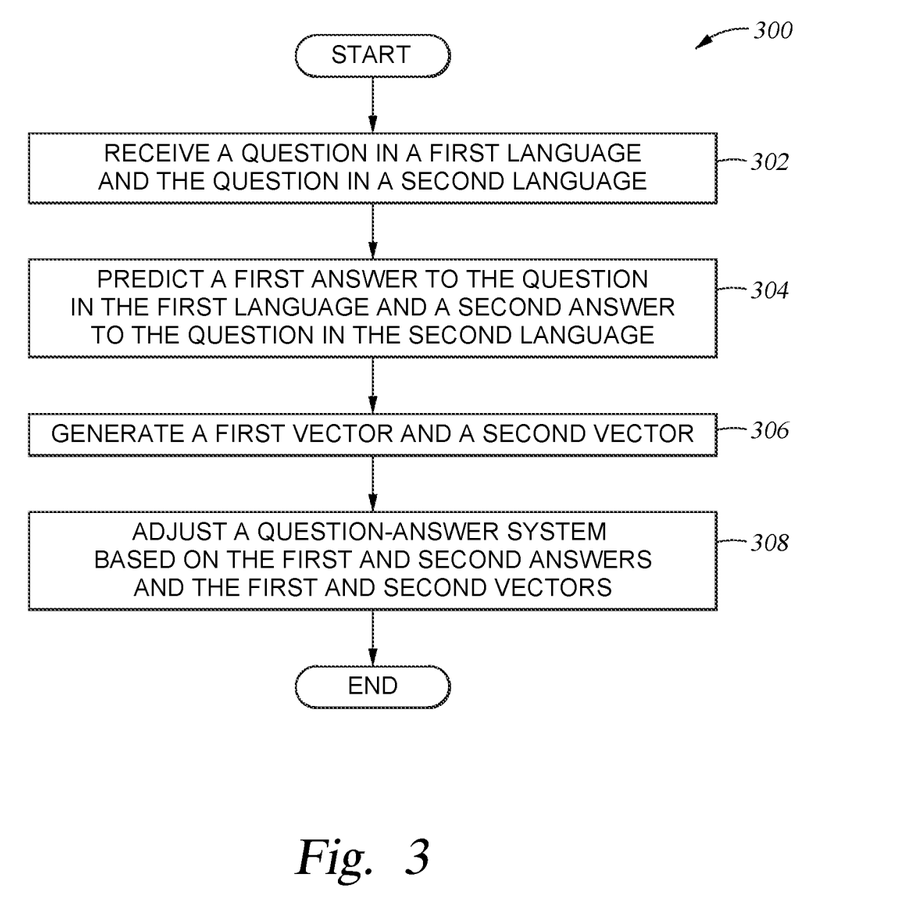
FIG. 3 is a flowchart of an example method of training a machine learning model in the question-answer system of FIG. 1.

FIG. 3 is a flowchart of an example method 300 of training a machine learning model 118 in the question-answer system 100 of FIG. 1. Generally, the question-answer device 108 performs the steps of the method 300. In particular embodiments, the question-answer device 108 improves the ability of a machine learning model 118 to answer questions presented in different languages by performing the method 300.

In step 302, the question-answer device 108 receives a question 202 in a first language and the question 204 in a second language. In step 304, the question-answer device 108 predicts a first answer 208 to the question in the first language and a second answer 212 to the question in the second language. The answers may include text extracted from a provided context 114. In step 306, the question-answer device 108 generates a first vector 210 and a second vector 214. The first vector 210 includes a numerical representation of the question 202 in the first language, and the second vector 214 includes a numerical representation of the question 204 in the second language. The vectors may indicate the words used in the questions or the meanings of the questions.

In step 308, the question-answer device 108 adjusts a question-answer system 100 (e.g., a machine learning model 118) based on the first and second answers and the first and second vectors. The adjustments may include adjusting weights of a machine learning model 118, so that the machine learning model 118 becomes better at predicting the correct answer to a question, regardless of the language in which the question is presented. The adjustments may be made according to the iterative training processes described with respect to FIG. 2A. For example, the question-answer device 108 may make adjustments to the machine learning model 118 to reduce a difference 220 between the first answer 208 and the second answer 212, and to reduce a distance 222 between the first vector 210 and the second vector 214. In this manner when the machine learning model 118 is used again to predict the first answer 224 and the second answer 228 and to generate the first vector 226 and the second vector 230, the difference 220 between the first answer 224 and the second answer 228 is reduced, and the distance 222 between the first vector 226 and the second vector 230 is reduced.

Figure 4:
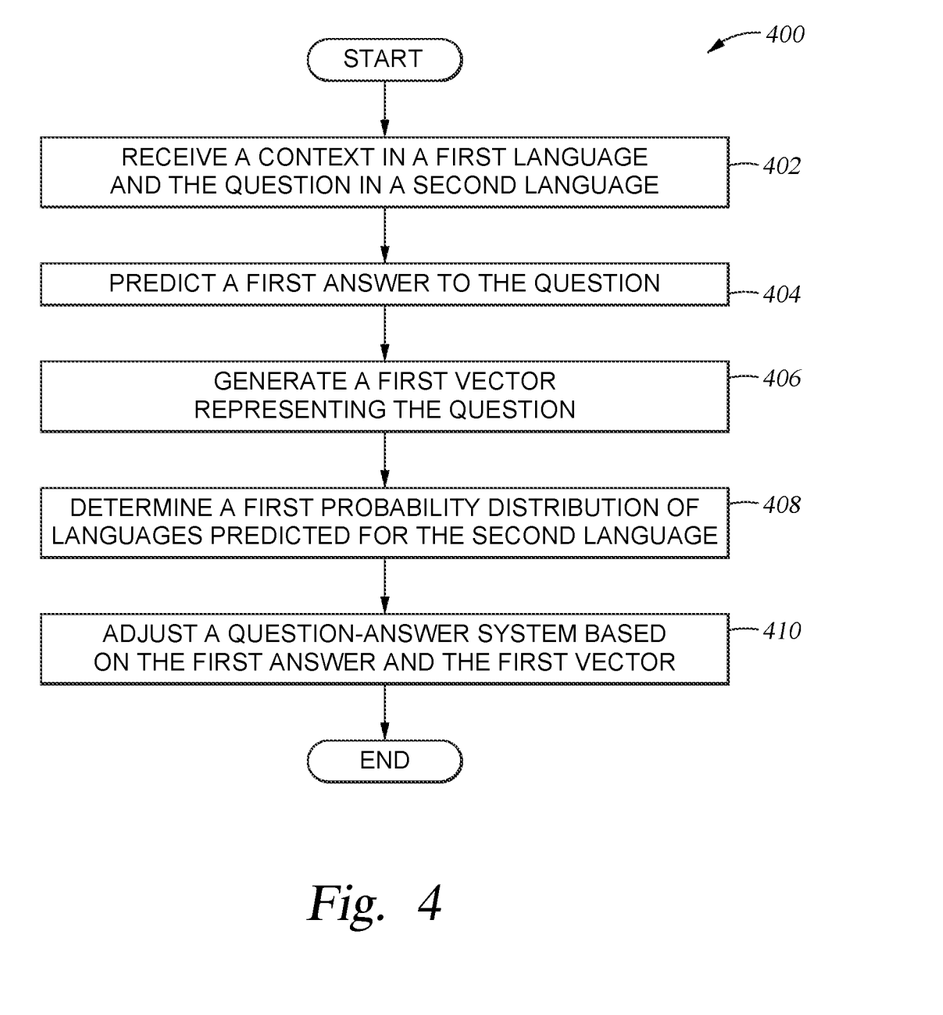
FIG. 4 is a flowchart of an example method of training a machine learning model in the question-answer system of FIG. 1.

FIG. 4 is a flowchart of an example method 400 of training a machine learning model 118 in the question-answer system 100 of FIG. 1. Generally, the question-answer device 108 performs the steps of the method 400. In particular embodiments, the question-answer device 108 improves the ability of a machine learning model 118 to answer questions presented in different languages by performing the method 400.

In step 402, the question-answer device 108 receives a context 114 in a first language and a question 204 in a second language. In step 404, the question-answer device 108 predicts a first answer 240 to the question 204. In step 406, the question-answer device 108 generates a first vector 244 representing the question 204. The question-answer device then determines a first probability distribution 248 of languages predicted for the second language in step 408.

In step 410, the question-answer device 108 adjusts a question-answer system 100 based on the first answer 240 and the first vector 244. The adjustments may be made according to the iterative training processes described with respect to FIG. 2B. For example, the question-answer device 108 may adjust weights of the machine learning model 118 and a discriminator 246, so that the machine learning model 118 generates vectors that are more language agnostic. Stated differently, the discriminator 246 experiences more difficulty predicting the language of the question, based on the vectors generated by the machine learning model 118. As a result, the probability distributions generated by the discriminator 246 more closely resemble the uniform distribution. Additionally, the question-answer device 108 may adjust the machine learning model 118 so that the machine learning model 118 predicts answers that more closely resemble a reference answer 206.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
   receiving, by a question-answer system, a question in a first language and the question in a second language;
   predicting, by the question-answer system, a first answer to the question in the first language and a second answer to the question in the second language;
   generating, by the question-answer system, a first vector representing the question in the first language and a second vector representing the question in the second language; and
   adjusting the question-answer system based on the first and second answers and the first and second vectors such that when the question-answer system subsequently generates a third vector representing the question in the first language and a fourth vector representing the question in the second language, a distance between the third and fourth vectors is less than a distance between the first and second vectors.

2. The method of claim 1, further comprising:
   determining a first loss based on the first answer and a reference answer;
   determining a second loss based on the second answer and the reference answer; and
   determining a third loss based on the first answer and the second answer, wherein adjusting the question-answer system is based on the first, second, and third losses, and the distance between the first and second vectors.

3. The method of claim 1, wherein the distance between the first and second vectors is based on a cosine of the first and second vectors.

4. The method of claim 1, further comprising receiving a context, wherein the first answer comprises text extracted from the context.

5. The method of claim 1, further comprising machine translating the question in the first language to produce the question in the second language.

6. The method of claim 1, further comprising training the question-answer system to predict answers based on training data in the first language.

7. An apparatus comprising:
   a memory; and
   a hardware processor communicatively coupled to the memory, the hardware processor configured to:
      receive a question in a first language and the question in a second language;
      predict, using a machine learning model, a first answer to the question in the first language and a second answer to the question in the second language;
      generate, using the machine learning model, a first vector representing the question in the first language and a second vector representing the question in the second language; and
      adjust the machine learning model based on the first and second answers and the first and second vectors such that when the machine learning model subsequently generates a third vector representing the question in the first language and a fourth vector representing the question in the second language, a distance between the third and fourth vectors is less than a distance between the first and second vectors.

8. The apparatus of claim 7, wherein the hardware processor is further configured to:
   determine a first loss based on the first answer and a reference answer;
   determine a second loss based on the second answer and the reference answer; and
   determine a third loss based on the first answer and the second answer, wherein adjusting the machine learning model is based on the first, second, and third losses, and the distance between the first and second vectors.

9. The apparatus of claim 7, wherein the distance between the first and second vectors is based on a cosine of the first and second vectors.

10. The apparatus of claim 7, wherein the hardware processor is further configured to receive a context, wherein the first answer comprises text extracted from the context.

11. The apparatus of claim 7, wherein the hardware processor is further configured to machine translate the question in the first language to produce the question in the second language.

12. The apparatus of claim 7, wherein the hardware processor is further configured to train the machine learning model to predict answers based on training data in the first language.

13. A method comprising:
    receiving, by a question-answer system, a context in a first language and a question in a second language;
    predicting, by the question-answer system and based on the context, a first answer to the question;
    generating, by the question-answer system, a first vector representing the question; and
    determining a first probability distribution of languages predicted, based on the first vector, for the second language;
    adjusting the question-answer system based on the first answer and the first vector such that when the question-answer system subsequently predicts a second answer to the question, generates a second vector representing the question, and determines a second probability distribution of languages predicted, based on the second vector, for the second language:
       a determined loss between the second answer and a reference answer is less than a determined loss between the first answer and the reference answer; and
       the second probability distribution is closer to a uniform distribution than the first probability distribution.

14. The method of claim 13, further comprising determining a first loss based on the first probability distribution and the second language, wherein adjusting the question-answer system is further based on the first loss such that a determined second loss based on the second probability distribution and the second language is less than the first loss based on the first probability distribution and the second language.

15. The method of claim 13, further comprising machine translating the question in the first language to produce the question in the second language.

16. The method of claim 13, further comprising training the question-answer system to predict answers based on training data in the first language.

17. An apparatus comprising:
a memory; and
a hardware processor communicatively coupled to the memory, the hardware processor configured to:
receive, by a question-answer system, a context in a first language and a question in a second language;
predict, by the question-answer system and based on the context, a first answer to the question;
generate, by the question-answer system, a first vector representing the question; and
determine a first probability distribution of languages predicted, based on the first vector, for the second language;
adjust the question-answer system based on the first answer and the first vector such that when the question-answer system subsequently predicts a second answer to the question, generates a second vector representing the question, and determines a second probability distribution of languages predicted, based on the second vector, for the second language:
a determined loss between the second answer and a reference answer is less than a determined loss between the first answer and the reference answer; and
the second probability distribution is closer to a uniform distribution than the first probability distribution.

18. The apparatus of claim 17, wherein the hardware processor is further configured to determine a first loss based on the first probability distribution and the second language, wherein adjusting the question-answer system is further based on the first loss such that a determined second loss based on the second probability distribution and the second language is less than the first loss based on the first probability distribution and the second language.

19. The apparatus of claim 17, wherein the hardware processor is further configured to machine translate the question in the first language to produce the question in the second language.

20. The apparatus of claim 17, wherein the hardware processor is further configured to train the question-answer system to predict answers based on training data in the first language.

* * * * *